United States Patent [19]
Nunogaki et al.

[11] Patent Number: 5,390,644
[45] Date of Patent: Feb. 21, 1995

[54] METHOD FOR PRODUCING FUEL/AIR MIXTURE FOR COMBUSTION ENGINE

[75] Inventors: Naochika Nunogaki, Mie; Minoru Ohta, Okazaki; Hirokatsu Mukai, Kuwana; Makoto Shirai, Yokkaichi; Toshihiro Suzumura, Nagoya; Shigenori Isomura, Kariya; Tatsunori Kato, Nagoya; Hiroyuki Tatebayashi, Handa; Akihiro Oka, Mie, all of Japan

[73] Assignee: Nippondenso Co., Ltd., Kariya, Japan

[21] Appl. No.: 996,812

[22] Filed: Dec. 23, 1992

[30] Foreign Application Priority Data

Dec. 27, 1991 [JP] Japan ................. 3-347145
Dec. 27, 1991 [JP] Japan ................. 3-347499
May 14, 1992 [JP] Japan ................. 4-122224

[51] Int. Cl.⁶ .................. F02M 25/08; F02M 33/02
[52] U.S. Cl. .................................................. 123/520
[58] Field of Search ............... 123/198 D, 516, 518, 123/519, 520, 521, 549; 73/25.01

[56] References Cited

U.S. PATENT DOCUMENTS

| | | | |
|---|---|---|---|
| 3,607,084 | 9/1971 | Mackey et al. | 73/25.01 |
| 4,062,223 | 12/1977 | Lamphere et al. | 73/25.01 |
| 4,063,898 | 12/1977 | Fisher | 73/25.01 |
| 4,748,959 | 6/1988 | Cook et al. | 123/698 |
| 4,945,885 | 8/1990 | Gonze et al. | 123/520 |
| 5,048,493 | 9/1991 | Orzel et al. | 123/520 |
| 5,090,388 | 2/1992 | Hamburg et al. | 123/520 |
| 5,111,796 | 5/1992 | Ogita | 123/520 |
| 5,125,385 | 6/1992 | Frinzel | 123/520 |
| 5,139,001 | 8/1992 | Tada | 123/520 |
| 5,145,495 | 3/1993 | Kitamoto et al. | 123/520 |
| 5,178,117 | 1/1993 | Fujimoto et al. | 123/148 D |
| 5,186,153 | 2/1993 | Steinbrenner et al. | 123/520 |
| 5,215,061 | 6/1993 | Ogawa et al. | 123/520 |
| 5,224,456 | 7/1993 | Hosoda et al. | 123/520 |

FOREIGN PATENT DOCUMENTS

| | | |
|---|---|---|
| 59-46338 | 3/1984 | Japan . |
| 62-20669 | 1/1987 | Japan . |
| 63-219863 | 9/1988 | Japan . |
| 2108843 | 4/1990 | Japan . |
| 2222815 | 9/1990 | Japan . |
| 2257068 | 10/1990 | Japan . |

Primary Examiner—Willis R. Wolfe
Assistant Examiner—Thomas Moulis
Attorney, Agent, or Firm—Cushman, Darby & Cushman

[57] ABSTRACT

The present invention pertains to a method for producing a mixture including an injected engine fuel from an injector, a combustion engine intake-air and an evaporative gas from the engine fuel. The method includes the steps of measuring a characteristic of the evaporative gas and changing step for changing a mixing ratio of the evaporative gas to at least one of the injected engine fuel and the combustion engine intake-air, according to the measured characteristic of the evaporative gas, by changing a flow rate of the combustion engine intake-air.

10 Claims, 12 Drawing Sheets

METHOD FOR PRODUCING FUEL/AIR MIXTURE FOR COMBUSTION ENGINE

BACKGROUND OF THE INVENTION AND RELATED ART STATEMENT

The present invention relates to a method for producing a mixture including an injected engine fuel, a combustion engine intake-air and an evaporative gas from the engine fuel.

In a conventional method for measuring a characteristic of a mixed gas, as disclosed by Publication of Japanese Laid-open Patent Application Shou-63-219863, an amount of an evaporative fuel emission contained in a charcoal canister is assumed, and a duty ratio of an electromagnetic valve in a discharge path of the evaporative fuel emission is controlled according to the assumed amount so that a flow rate of the evaporative fuel emission into an engine intake-air is adjusted. Further, Publication of Japanese Laid-open Patent Application Shou-62-20669 discloses an apparatus for preventing an evaporative fuel emission from being discharged to the atmosphere, comprising an operational condition detecting device in which an operational condition of an internal combustion engine is detected by measuring an intake-air flow rate, an opening degree of a throttle valve, a content of oxygen remaining in an exhaust gas and so forth, and an adjusting device by which an opening degree of an evaporative fuel emission path is adjusted according to the detected operational condition of the internal combustion engine.

OBJECT AND SUMMARY OF THE INVENTION

An object of the present invention is to provide a method for producing a mixture including an injected engine fuel, a combustion engine intake-air and an evaporative gas from the engine fuel, by which method a fuel/air ratio supplied into the combustion engine is kept at a desired degree.

Another object of the present invention is to provide various methods for measuring a characteristic of the evaporative gas for producing the fuel/air mixture.

According to the present invention, a method for producing a mixture including an injected engine fuel, a combustion engine intake-air and an evaporative gas from the engine fuel, comprises, the steps of:
measuring step for measuring a characteristic of the evaporative gas; and
mixing ratio changing step for changing a mixing ratio according to the measured characteristic of the evaporative gas between the evaporative gas and the combustion engine intake-air by changing a flow rate of the combustion engine intake air.

In the present invention, since the mixing ratio between the evaporative gas and the combustion engine intake-air is changed according to the measured characteristic of the evaporative gas, the fuel/air ratio of the mixture including the the evaporative gas and the combustion engine intake-air, which is supplied into the combustion engine, is kept at a desired degree.

DETAILED DESCRIPTION OF PREFERRED EMBODIMENTS

Figure 1:
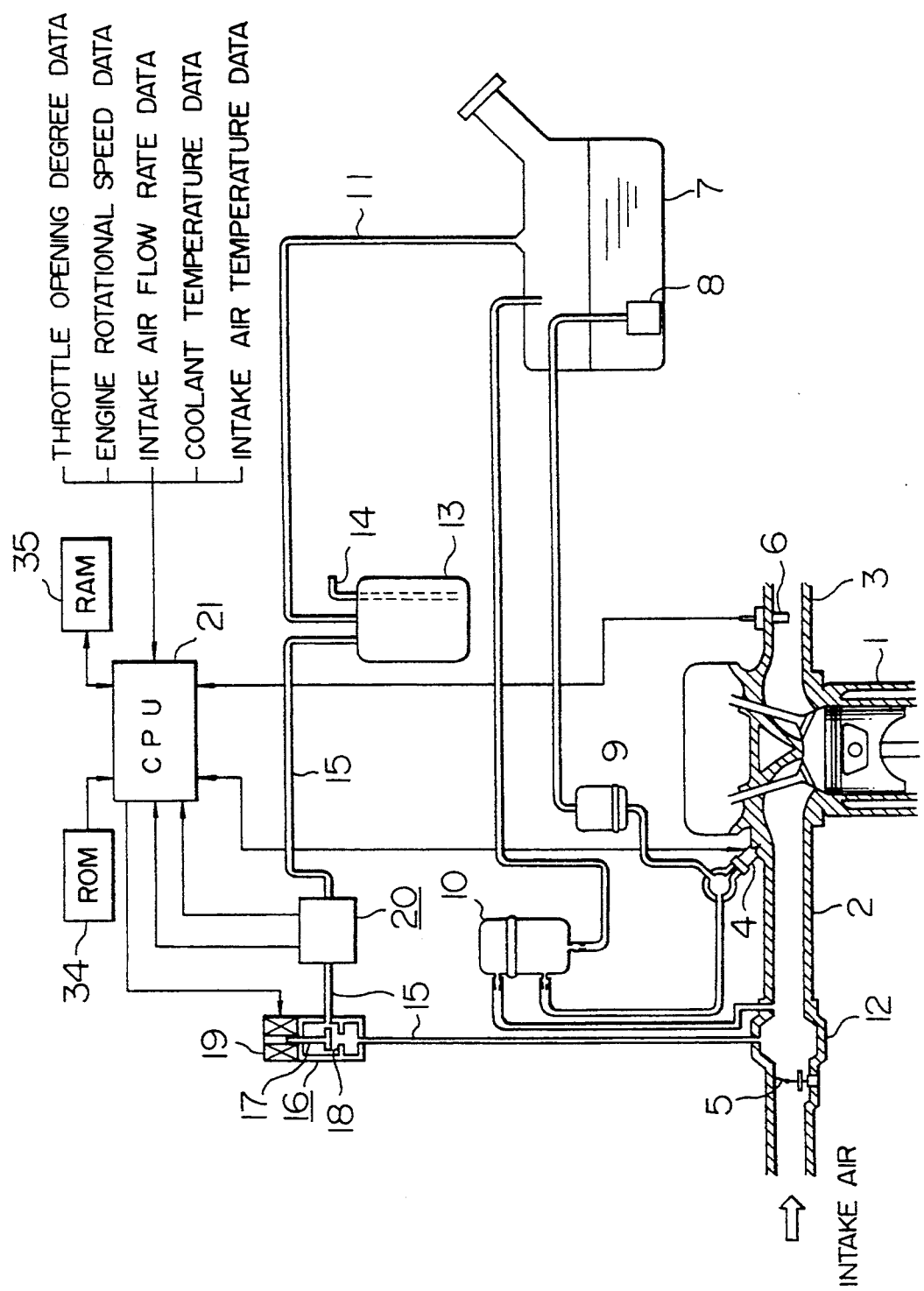
FIG. 1 is a schematic view showing a carburetor system of an internal combustion engine used for the present invention.

In an embodiment of the present invention, as shown in FIG. 1, a multi-cylindered engine 1 for vehicle is connected to an intake-air tube 2 and to an exhaust-air tube 3. An electro-magnetic type injector 4 is arranged in an inner end of the intake-air tube 2, and a throttle valve 5 is arranged at an upstream side of the injector 4. An oxygen sensor 6 is arranged on the exhaust-air tube 3 to generate a voltage signal corresponding to a content or density of oxygen in an exhaust gas so that a fuel/air ratio supplied to the engine 1 is measured.

A fuel supply system for supplying a fuel to the injector 4 including a fuel tank 7, a fuel pump 8, a fuel filter 9 and a pressure regulator 10 so that the fuel is fed from the fuel tank 7 by the fuel pump 8 through the fuel filter 9 to the injector 4, and a pressure of the fuel supplied to the injector 4 is adjusted at a predetermined value by the pressure regulator 10.

A purge tube 11 extends from an upper portion of the fuel tank 7 to a surge tank 12 on the intake-air tube 2 so that an evaporative gas from the fuel flows out from the fuel tank 7. A canister 13 containing active carbon is arranged on the purge tube 11 to absorb the evaporative gas. The canister 13 has an atmospherically opened hole 14 to take the atmospheric air into the canister 13. A discharge path 15 extends from the canister 13 to the surge tank 12, and a variable flow rate electro-magnetic valve (flow rate control valve) 16 is arranged on the discharge path 15. In the flow rate control valve 16, a valve spool 17 is urged constantly by a spring (not shown) to close a seat 18, and is urged by an energized electro-magnetic coil 19 to open the seat 18 so that a flow through the discharge path 15 is controlled according to an energizing condition of the coil 19. An opening degree of the flow rate control valve 16 is determined by a duty ratio variation or energizing pulse width variation.

A measuring device 20 is arranged on a part of the purge tube 11 between the canister 13 and the flow rate control valve 16 so that a flow rate or speed of the evaporative gas flowing in the purge tube 11 and a content or density of hydrocarbon in the evaporative gas are measured.

A throttle opening degree signal from a throttle sensor (not shown) for measuring an opening degree of the throttle valve 5, an engine rotational speed signal from a rotational speed sensor (not shown) for measuring an output rotational speed of the engine 1, and an intake-air flow rate signal from an intake-air flow rate sensor (not shown) for measuring a flow rate of an intake-air passing through the throttle valve 5 are input to a central processing unit (CPU) 21. Further, a coolant temperature signal from a coolant temperature sensor (not shown) for measuring a temperature of an engine coolant, an intake air temperature signal from an intake-air temperature sensor (not shown) for measuring a temperature of a combustion engine intake air, and evaporative gas flow speed and hydrocarbon content signals from the measuring device 20 are input to the CPU 21.

In addition, a voltage signal from the oxygen sensor 6 is input to the CPU 21 to judge as to whether a fuel/air mixture changes from the fuel-rich condition to the fuel-lean condition. When the fuel/air mixture changes from the fuel-rich condition to the fuel-lean condition or from the fuel-lean condition to the fuel-rich condition, the CPU 21 changes in a staircase or skip manner a feed-back compensation coefficient between the injected fuel flow rate or fuel injected rate and the oxygen content in the exhaust gas, and when the fuel/air mixture is of the fuel-rich condition or the fuel-lean condition, the CPU 21 changes gradually the feed-back compensation coefficient. This feed-back control is not performed when the coolant temperature is low, or an engine load is high, or the engine rotational speed is high. The CPU 21 calculates a basic fuel injection time from the engine rotational speed and the intake-air flow rate, changes the basic fuel injection time through another feed-back compensation coefficient or the like to obtain a finally calculated fuel injection time, and control the injector 4 to inject the fuel at a predetermined injection timing for the finally calculated fuel injection time.

The CPU 21 calculates a flow rate of the evaporative gas, a flow rate of the hydrocarbon gas contained in the evaporative gas and a flow rate of the air contained in the evaporative gas from the evaporative gas flow speed and hydrocarbon content data from the measuring device 20. The CPU 21 controls the injector 4 and the flow rate control valve 16 according to the calculated flow rates of the evaporative gas, the hydrocarbon gas, and the air contained in the evaporative gas, as described below.

A read-only memory (ROH) 34 contains a program shown in FIGS. 4–8, programs and maps for controlling an engine operation, and so forth. The flow rate of the evaporative gas, the content of the hydrocarbon gas in the evaporative gas, the flow rate of the hydrocarbon gas in the evaporative gas and the flow rate of the air in the evaporative gas are calculated on the maps, respectively. A random access memory (RAM) 35 stores temporarily various data, for example, the opening degree data of the throttle valve 5, the engine output rotational speed data, output data from sensors 28 and 29 described below, or the like. The CPU 21 controls the engine operation on the programs contained in the ROH 34. A combination of the CPU 21, the ROH 34 and the RAH 35 forms a control system for the fuel/air mixture to be burnt in the engine 1.

Figure 2:
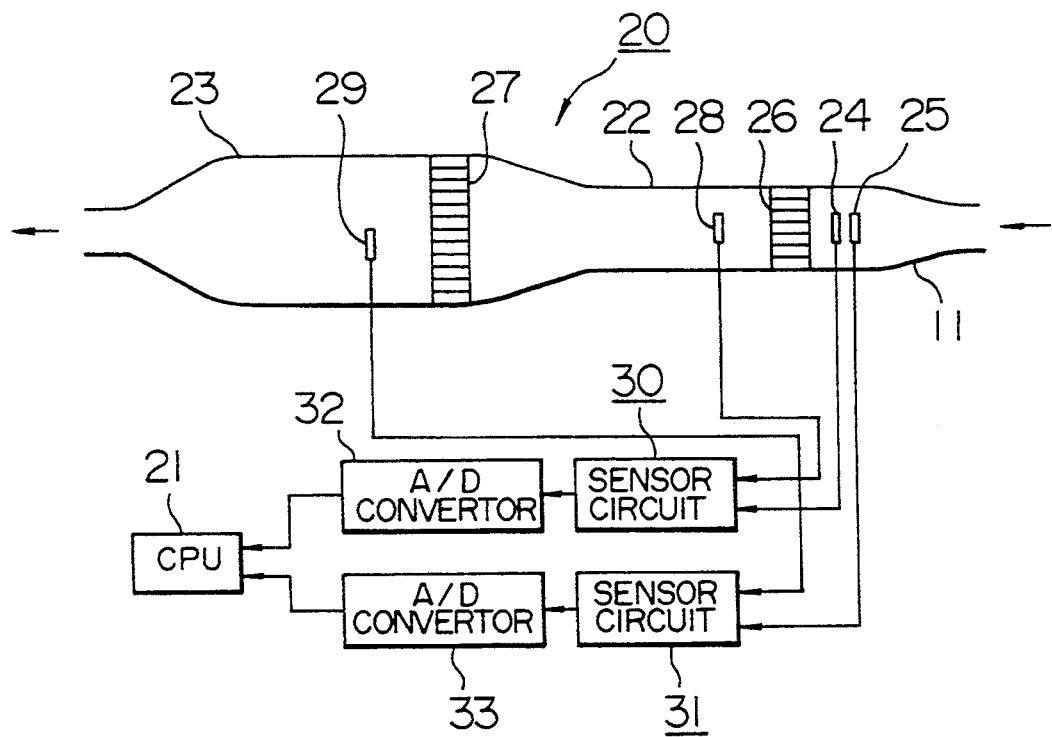
FIG. 2 is a schematic view showing a measuring system used for the present invention.

In FIG. 2, the measuring device 20 is shown in detail. In the purge tube 11, two measuring portions 22 and 23 whose inner cross-sectional opening areas are different from each other are arranged in series. Temperature sensors 24 and 25 of heat energy generating electrical resistances are arranged at the most upstream side of the measuring portion 22 to compensate the measured flow speed of the evaporative gas against an electrical resistance variation generated by a temperature variation of the evaporative gas. Laminar flow generating plates 26 and 27 are arranged at respective upstream sides of the measuring portions 22 and 23, and sensors 28 and 29 of heat energy generating electrical resistances are arranged at respective downstream sides of the laminar flow generating plates 26 and 27. Each of the sensors 28 and 29 is electrically energized to generate a heat energy therefrom for keeping a difference in temperature between each of the sensors 28 and 29 and the evaporative gas constant and making a temperature of each of the sensors 28 and 29 higher than the evaporative gas. Therefore, the heat energy generated by each of the sensors 28 and 29 is substantially equal to a heat energy absorbed by the evaporative gas, and a voltage applied to each of the sensors 28 and 29 for generating the heat energy thereof is used as an output signal therefrom. The temperature sensors 24 and 25 and the sensors 28 and 29 are electrically connected to respective sensor circuits 30 and 31. Each of the temperature sensors 24 and 25 and the sensors 28 and 29 includes an aluminum substrate and a platina thin layer electrical resistance formed thereon through a photo-lithography process. Alternatively, each of the temperature sensors 24 and 25 and the sensors 28 and 29 may be another type, for example, a platina wire coil wound on a cylindrical alumina ceramic.

The sensor circuits 30 and 31 are electrically connected to the CPU 21 through analogue-to-digital (A/D) convertors 32 and 33, respectively. Therefore, an output signal from the sensor circuit 30 on the temperature sensor 24 and the sensor 28 and an output signal from the sensor circuit 31 on the temperature sensor 25 and the sensor 29 are input to the CPU 21. A combination of the measuring portions 22 and 23, the temperature sensors 24 and 25, the sensors 28 and 29 and the analogue-to-digital convertors 32 and 33 form a measuring device.

Figure 3:
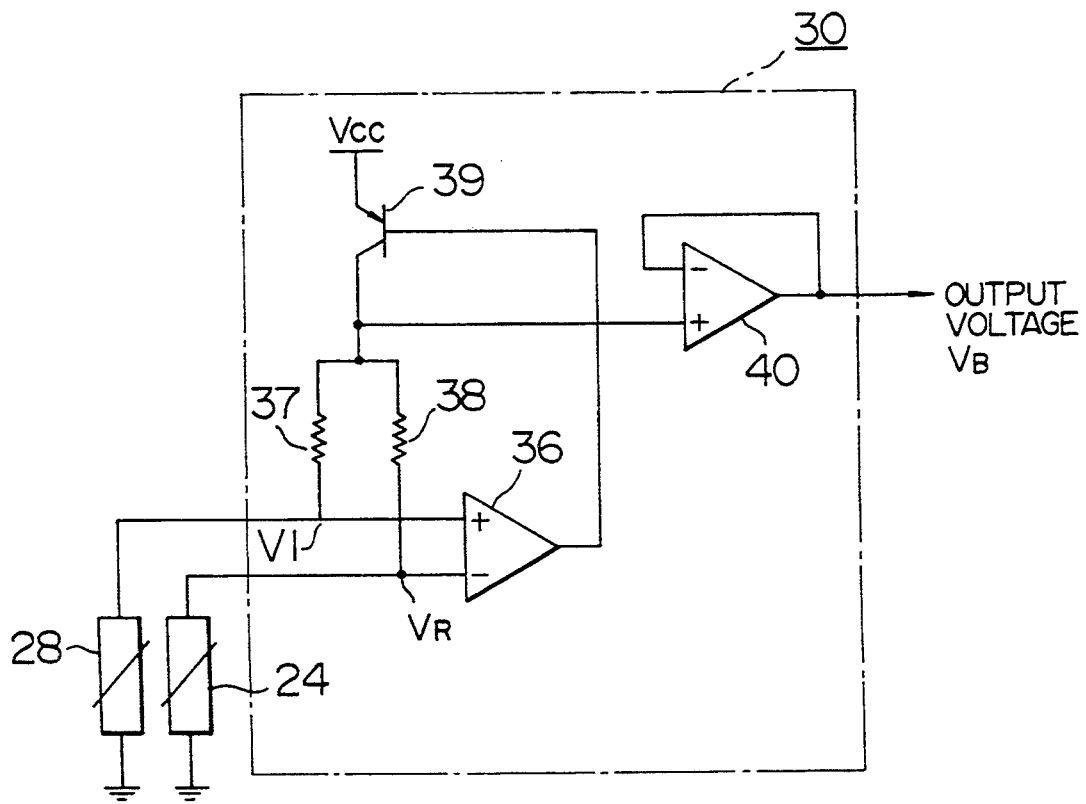
FIG. 3 is a diagram showing an electric circuit in a measuring system used for the present invention.

In the sensor circuit 30, as shown in FIG. 3, an end of the temperature sensor 24 is connected to an inverting input terminal of a comparator 36 and to an electrical resistance 38, and another end thereof is electrically grounded. An end of the sensor 28 is connected to a non-inverting input terminal of the comparator 36 and to an electrical resistance 37, and another end thereof is electrically grounded. The temperature sensor 24, the sensor 28, and the electrical resistances 37 and 38 form an electrical resistance bridge circuit. An output terminal of the comparator 36 is electrically connected to a base terminal of a transistor 39, an emitter terminal of the transistor 39 is electrically connected to an electricity source Vcc of a predetermined voltage, and a collector terminal of the transistor 39 is electrically connected to the electrical resistances 77 and 38. An input terminal of a buffer 40 is connected to a connecting portion between the collector terminal and the electrical resistances 37 and 38. The sensor circuit 31 is formed similarly.

When the flow speed of the evaporative gas in the purge tube 11 increases to decrease the temperature of the sensor 28 and whereby an electrical resistance value of the sensor 28 decreases so that a sensor voltage V1 of the non-inverting input terminal of the comparator 36 becomes equal to or lower than a reference voltage VR of the inverting input terminal of the comparator 36, an output voltage of the output terminal of the comparator 36 increases an electrical current between the emitter terminal and the collector terminal in the transistor 39. Therefore, the heat energy generated from the sensor 28 is increased, and a voltage value of the collector terminal of the transistor 39, that is, an output voltage Va of the buffer 40 is increased. When the flow speed of the evaporative gas in the purge tube 11 decreases to increase the temperature of the sensor 28 and whereby the electrical resistance value of the sensor 28 increases so that the sensor voltage V1 of the non-inverting input terminal of the comparator 36 becomes higher than the reference voltage VR of the inverting input terminal of the comparator 36, the output voltage of the output terminal of the comparator 36 decreases the electrical current between the emitter terminal and the collector terminal in the transistor 39. Therefore, the heat energy generated from the sensor 28 is decreased, and the voltage value of the collector terminal of the transistor 39, that is, the output voltage Va of the buffer 40 is increased. In this way, a voltage across the sensor 28 for generating the heat energy to keep the constant temperature difference between the sensor 28 and the evaporative gas corresponds to a heat transfer characteristic between the sensor 28 and the evaporative gas, which characteristic is substantially determined by a dynamic heat exchange coefficient varying according to the flow speed of the evaporative gas and to components of the evaporative gas and a static heat exchange coefficient varying according to the components of the evaporative gas but not to the flow speed of the evaporative gas. The product of the heat transfer characteristic between the sensor 28 and the evaporative gas and the temperature difference therebetween corresponds to the heat energy for keeping the constant temperature difference therebetween. The sensor circuit 31 operates similarly.

In the measuring device 20, when the flow rate control valve 16 is open so that the evaporative gas from the canister 13 passes the measuring portions 22 and 23, a difference in cross-sectional opening area between the measuring portions 22 and 23 makes a flow speed of the evaporative gas at the measuring portion 22 different from that at the measuring portion 23. Therefore, the heat energy generated by the sensor 28 for keeping the constant temperature difference between the sensor 28 and the evaporative gas is different from the heat energy generated by the sensor 29 for keeping the constant temperature difference between the sensor 29 and the evaporative gas so that a value of an output signal of the sensor circuit 30 corresponding to the heat energy generated by the sensor 28 is different from that of the sensor circuit 31 corresponding to the heat energy generated by the sensor 29. The CPU 21 calculates the flow rate of the evaporative gas and the content of hydrocarbon in the evaporative gas from the output signals of the sensor circuits 30 and 31. Further, the CPU 21 calculates the flow rate of the hydrocarbon gas and the flow rate of the air in the evaporative gas from the flow rate of the evaporative gas and the content of hydrocarbon in the evaporative gas.

Figure 4:
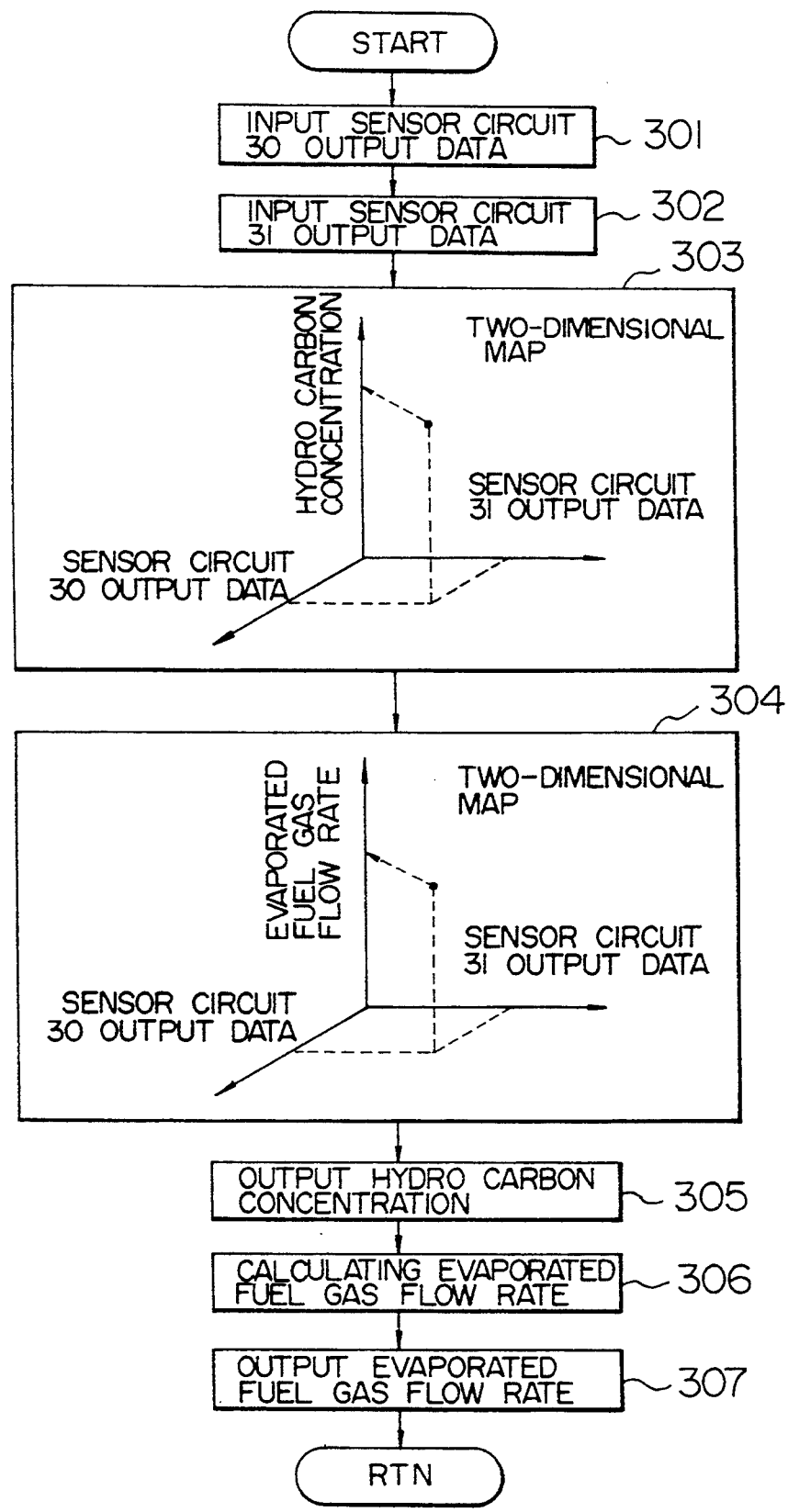
FIG. 4 is a flow chart for measuring a flow rate (speed) of an evaporative gas and a content of hydrocarbon (vaporized fuel) contained by the evaporative gas.

The flow rate of the evaporative gas and the content of hydrocarbon in the evaporative gas are obtained as shown in FIG. 4. At step 301, the output signal from the sensor circuit 30 is stored temporarily in the RAM 35 after the A/D conversion. At step 302, the output signal from the sensor circuit 31 is stored temporarily in the RAH 35 after the A/D conversion. A difference in degree between the output signals from the sensor circuits 30 and 31 corresponds to a difference between the evaporative gas flow speed at the measuring portion 22 and the evaporative gas flow speed at the measuring portion 23. At step 303, a two-dimensional address on the map stored in the ROH 34 for calculating the content of hydrocarbon is identified by the output signals from the sensor circuits 30 and 31 so that the content of hydrocarbon is obtained on the identified two-dimensional address in the map. At step 304, another two-dimensional address on the map stored in the ROH 34 for calculating the evaporative gas flow speed is identified by the output signals from the sensor circuits 30 and 31 so that the evaporative gas flow speed is obtained on the identified two-dimensional address in the map. At step 305, a calculated data of the content of hydrocarbon is stored temporarily in the RAM 35. At step 306, the flow rate of the evaporative gas is calculated from the evaporative gas flow speed and the cross-sectional opening area of the measuring portion 22 or 23. At step 307, the calculated flow rate of the evaporative gas is stored temporarily in the RAM 35.

The evaporative gas flow speed and the content of hydrocarbon corresponding to each of the two-dimensional addresses on each of the maps in the ROM 34 are calculated from below functional equations. The heat energy Q generated by each of the sensors 28 and 29 is obtained from the following functional equation, when $f(\lambda, \mu)$ is the dynamic heat exchange coefficient, $g(\lambda, \mu)$ is the static heat exchange coefficient, $\lambda$ is a heat transfer coefficient of the gas, $\mu$ is a viscosity of the gas, U is the gas flow speed, T is a temperature of each of the sensors 28 and 29, and TG is a temperature of the gas.

$$Q = \{f(\lambda, \mu)^* U^{1/2} + g(\lambda, \mu)\}^*(T - TG) \tag{1}$$

When SA is the cross-sectional opening area of the measuring portion 22, SB is the cross-sectional opening area of the measuring portion 23, UA is the evaporative gas flow speed at the measuring portion 22, UB is the evaporative gas flow speed at the measuring portion 23, QA is the heat energy generated by the sensor 28, and QB is the heat energy generated by the sensor 29, the following functional equations can be obtained.

$$QA = \{f(\lambda, \mu)^* UA^{\frac{1}{2}} + g(\lambda, \mu)\}^*(T - TG) \tag{2}$$

$$QB = \{f(\lambda, \mu)^* UB^{\frac{1}{2}} + g(\lambda, \mu)\}^*(T - TG) \tag{3}$$

$$UB = (SA/SB) * UA \tag{4}$$

$$\therefore QB = \{f(\lambda, \mu)^*(SA/SB)^* UA^{\frac{1}{2}} + g(\lambda, \mu)\}^*(T - TG) \tag{5}$$

$$\therefore g(\lambda, \mu) = \tag{6}$$

$$\{(SA/SB)^{-\frac{1}{2}} * (QB - QA)\} / \{((SA/SB)^{-\frac{1}{2}} - 1)^*(T - TG)\}$$

From the static heat exchange coefficient $g(\lambda, \mu)$, the component ratio of the gas or the content of hydrocarbon in the evaporative gas is obtained. Further, from the component ratio of the gas or the content of hydrocarbon in the evaporative gas, the dynamic heat exchange coefficient $f(\lambda, \mu)$ is obtained. Through the functional equation (5), the evaporative gas flow speed UB at the measuring portion 23 is calculated from the static heat exchange coefficient $g(\lambda, \mu)$ and the dynamic heat exchange coefficient $f(\lambda, \mu)$. The flow rate of the evaporative gas is calculated from the evaporative gas flow speed UB and the cross-sectional opening area of the measuring portion 23.

Figure 5:
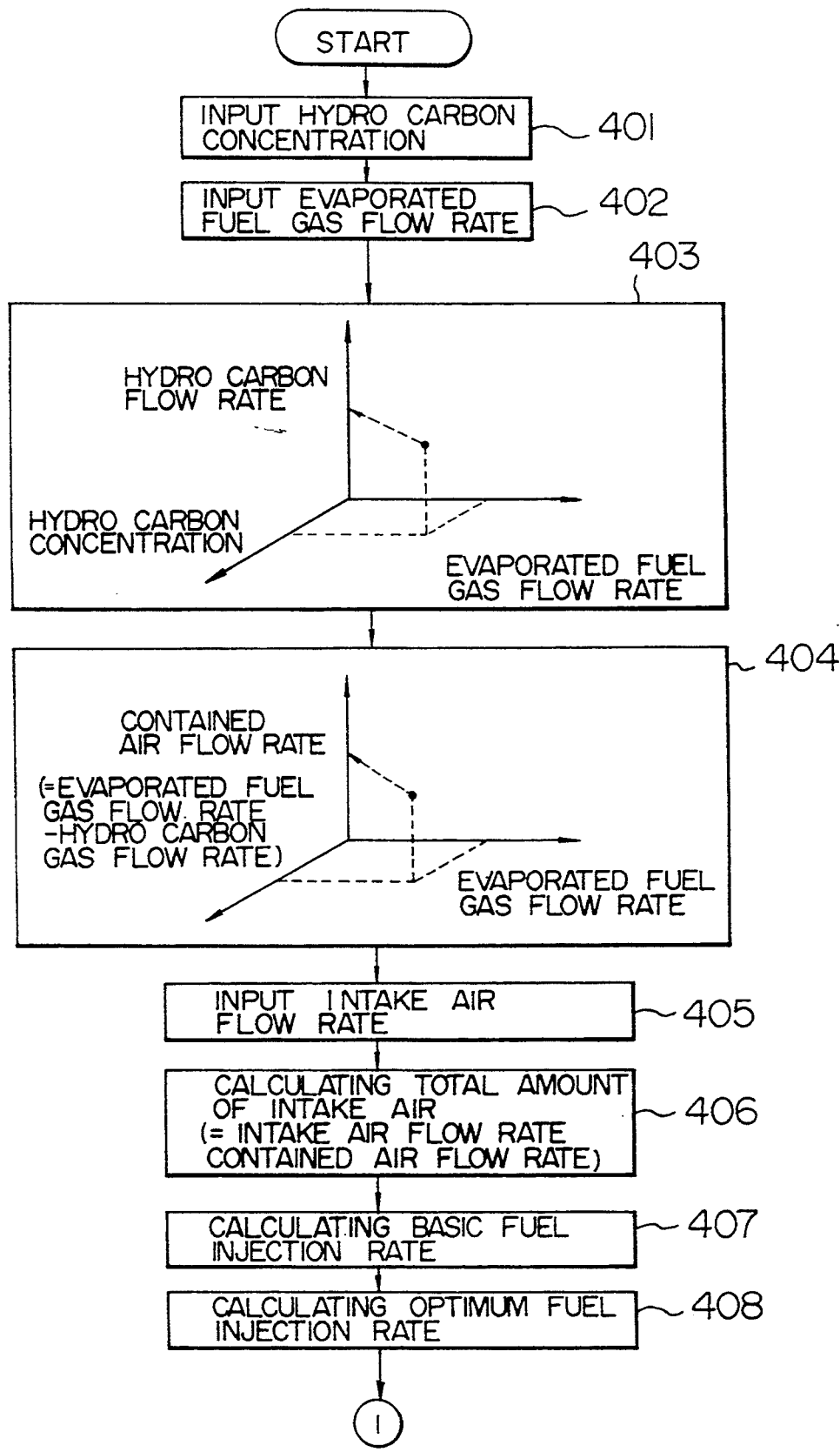
FIG. 5 is a part of a flow chart for controlling a fuel injector.
Figure 6:
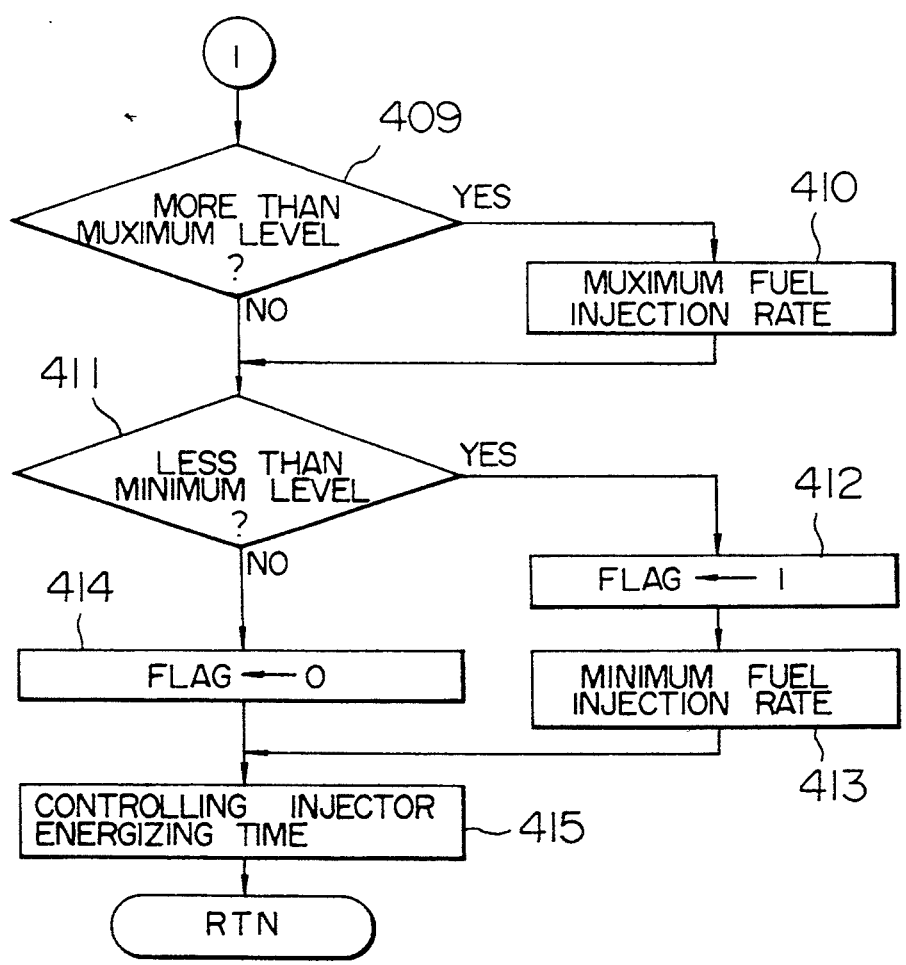
FIG. 6 is another part of the flow chart for controlling the fuel injector.
Figure 7:
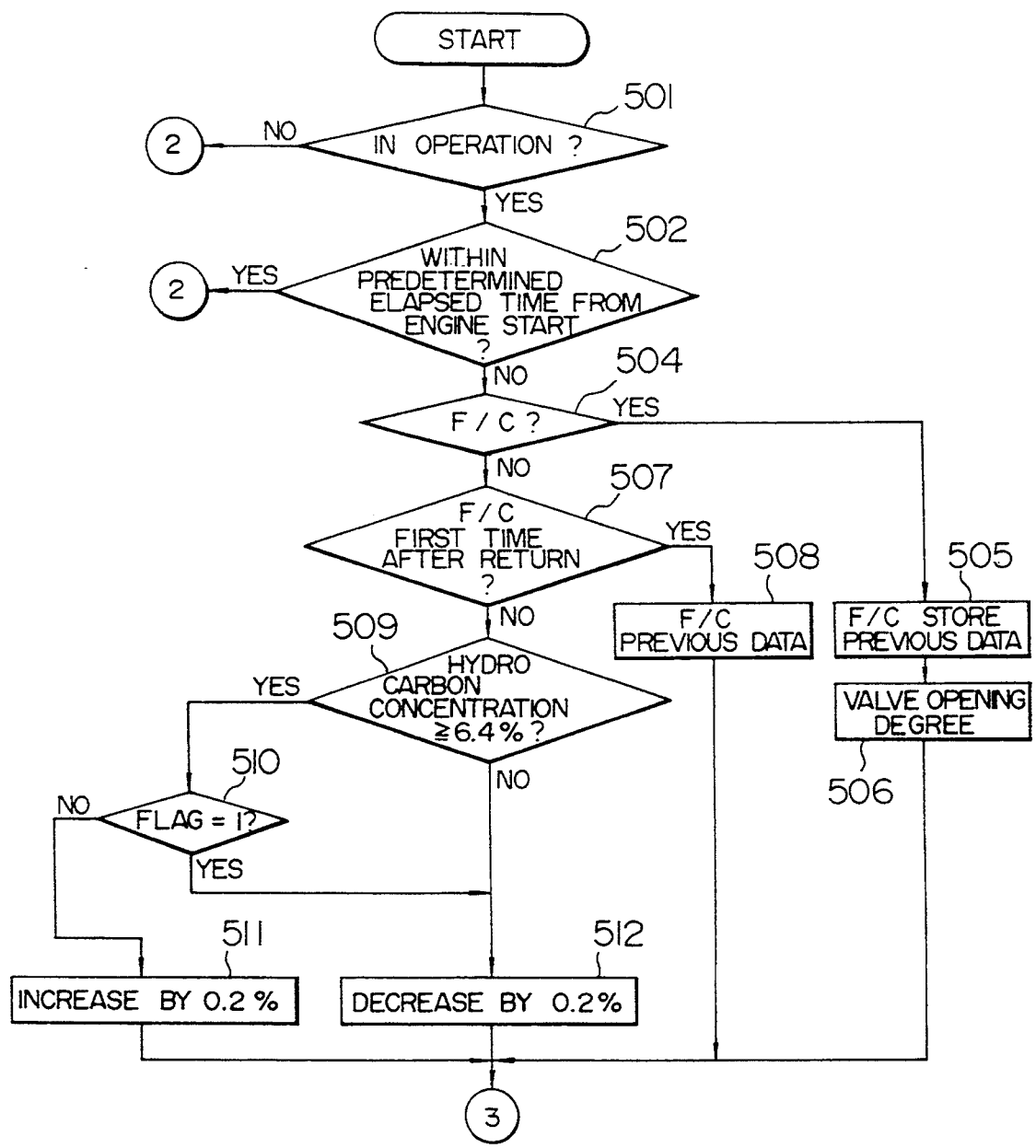
FIG. 7 is a part of a flow chart for controlling an evaporative gas flow control valve.
Figure 8:
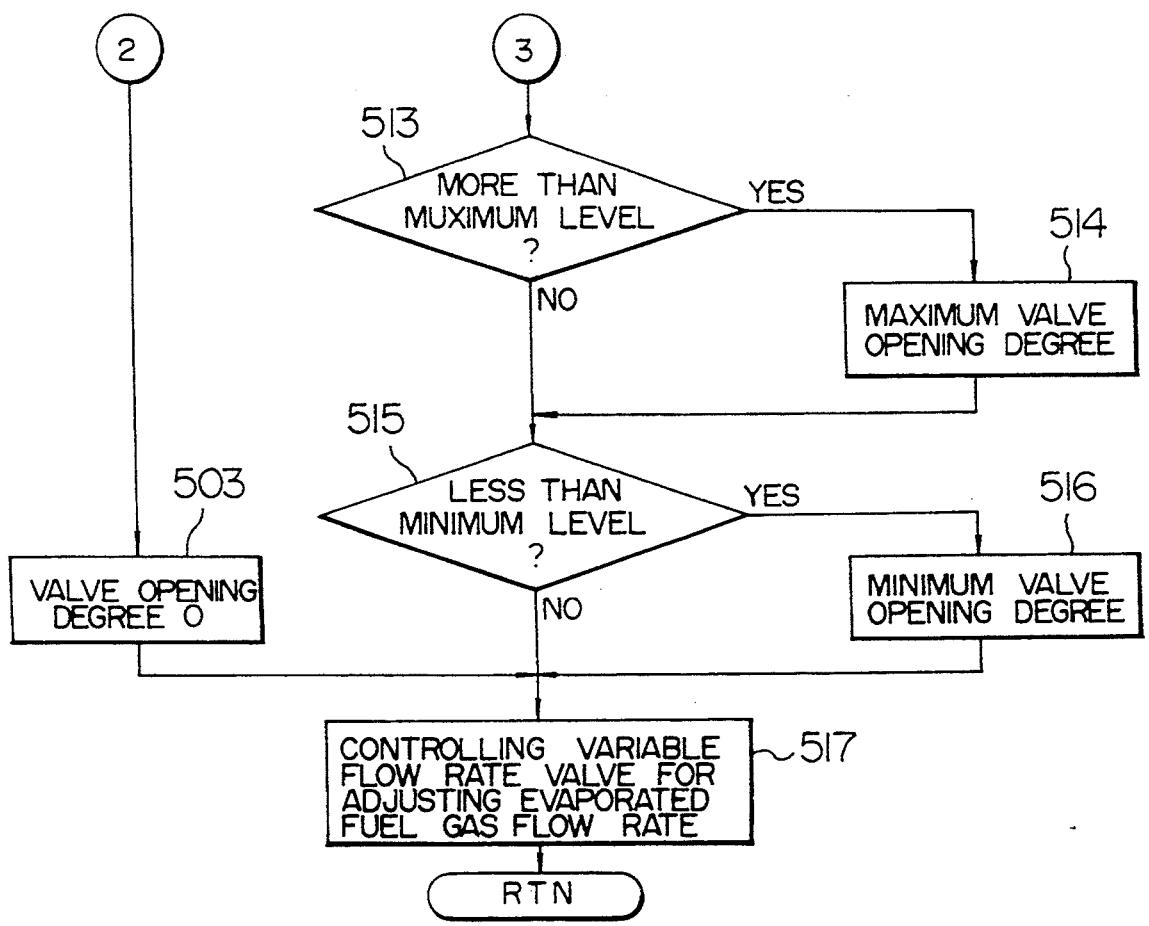
FIG. 8 is another part of the flow chart for controlling an evaporative gas flow control valve.

The injector 4 is controlled as shown in FIGS. 5 and 6, and the opening degree of the flow rate control valve 16 is controlled by a duty ratio adjustment as shown in FIGS. 7 and 8. A control sequence cycle for each of the injector 4 and the flow rate control valve 16 is repeated with a predetermined cycle time.

As shown in FIGS. 5 and 6, at step 401, the content of hydrocarbon in the evaporative gas and the flow rate of the evaporative gas calculated as shown in FIG. 4 are read out from the RAM 35. At steps 403 and 404, a two-dimensional address on the map stored in the ROM 34 for calculating the flow rate of hydrocarbon in the respective predetermined cycle time is identified by the the read out content of hydrocarbon in the evaporative gas and the read out flow rate of the evaporative gas so that the flow rate of the hydrocarbon gas is obtained on the identified two-dimensional address. Another two-dimensional address on the map stored in the ROM 34 for calculating the flow rate of the air contained by the evaporative gas is identified by the the read out content of hydrocarbon in the evaporative gas and the read out flow rate of the evaporative gas so that the flow rate of the air contained by the evaporative gas (the flow rate of the evaporative gas—the flow rate of the hydrocarbon gas in the evaporative gas) is obtained on the identified two-dimensional address. The flow rate of the hydrocarbon gas and the flow rate of the air contained by the evaporative gas are stored temporarily in the RAM 35.

At step 405, the intake-air flow rate measured by the intake-air flow rate sensor (not shown) is read out, and at step 406, a total amount of the air taken into the combustion engine 1 to be burnt therein is calculated from the read out intake-air flow rate and the flow rate of the air contained by the evaporative gas as obtained at step 404. At step 407, a basic fuel injection rate to be supplied into the engine 1 is calculated from the above calculated total amount of the air, the throttle valve opening degree in the RAM 35, the engine output rotational speed signal, the coolant temperature, the intake-air temperature, the vehicle speed and so forth. At step 408, an optimum fuel injection rate to be supplied from the injector 4 is calculated by subtracting the flow rate of hydrocarbon gas in the evaporative gas as calculated at step 403 from the basic fuel injection rate as calculated at step 407.

At step 409, it is judged whether the optimum fuel injection rate calculated at step 408 is less than a maximum fuel injection rate of the injector 4 or not. When the optimum fuel injection rate calculated at step 408 is more than or equal to the maximum fuel injection rate of the injector 4, the fuel injection rate of the injector 4 is set at the maximum fuel injection rate thereof, at step 410. At step 411, it is judged whether the optimum fuel injection rate calculated at step 408 is more than a minimum fuel injection rate of the injector 4 or not. When the optimum fuel injection rate calculated at step 408 is less than or equal to the minimum fuel injection rate of the injector 4, a flag memory indicating that the optimum fuel injection rate calculated at step 408 is less than or equal to the minimum fuel injection rate of the injector 4 is set by "1" at step 412, and the fuel injection rate of the injector 4 is set at the minimum fuel injection rate thereof, at step 413. When the optimum fuel injection rate calculated at step 408 is more than the minimum fuel injection rate of the injector 4, the flag memory is set by "0" at step 414, and the fuel injection rate of the injector 4 is set at the optimum fuel injection rate thereof. Finally, at step 415, the injector 4 is controlled by a signal corresponding to the above determined fuel injection rate.

The flow rate control valve 16 is controlled to change the opening degree thereof by adjusting the duty ratio so that the flow rate of the evaporative gas supplied into the intake-air tube 2 is controlled. As shown in FIGS. 7 and 8, firstly, at step 501, it is judged as to whether the engine 1 is rotating or not. When the engine output rotational speed is more than a predetermined rotational speed (for example, an idling rotational speed), the engine 1 is judged to be rotating. When the engine 1 is judged not to be rotating, an opening degree control signal of the flow rate control valve 16 is set by "0" to close the flow rate control valve 16 at step 503, and the control flow proceeds to step 517. When the engine 1 is judged to be rotating, the control flow proceeds to step 502 to judge as to whether a predetermined time elapsed after an engine start or not. When the predetermined time did not elapse after an engine start, the control flow proceeds to step 503. At step 502, it may be judged as to whether the coolant temperature is more than a predetermined or not, instead of judging regarding the elapse of the predetermined time. When the engine output rotational speed is less than the predetermined rotational speed or the predetermined time did not elapse after the engine start, a predetermined treatment other than the treatment of the evaporative gas must be performed and the treatment of the evaporative gas is not performed.

In case that the predetermined time elapses after the engine start, the control flow proceeds to step 504 to judge as to whether the fuel injection to the engine 1 is cut or not. When the idling rotational speed of the engine 1 is higher than a desirable degree though the coolant temperature is more than a predetermined degree, or when an engine brake operation is necessary, the fuel injection to the engine 1 is to be cut. When the fuel injection to the engine 1 is to be cut, the opening degree of the flow rate control valve 16 before the fuel injection cutting is stored at step 505, a data memory indicating the opening degree of the flow rate control valve 16 is set by "0" at step 506, and the control flow proceeds to step 513. When the fuel injection to the engine 1 is not to be cut, the control flow proceeds to step 507 to judge as to whether the fuel injection to the engine 1 starts to be prevented from being cut just before the present step 507. When the fuel injection to the engine i starts to be prevented from being cut just before the present step 507, the control flow proceeds to step 508 to store the opening degree of the flow rate control valve 16 performed just before the fuel injection to the engine 1 is cut. Thereafter, the control flow proceeds to step 513.

At step 509, it is judged as to whether the content of the discharged hydrocarbon gas is more than a predetermined value or not, for example, 6.4% as a theoretical fuel air ratio. When the content of the discharged hydrocarbon gas is less than the theoretical fuel air ratio, an amount of the evaporative gas contained by the canister 13 is deemed to be small, and the opening degree of the flow rate control valve 16 is decreased by 0.2% at step 512 to decrease a flow rate of the discharged hydrocarbon gas. Thereafter, the control flow proceeds to step 513. When the content of the discharged hydrocarbon gas is more than the theoretical fuel air ratio, the control flow proceeds to step 510. At step 510, the flag indicating whether the optimum fuel injection rate of the injector 4 calculated through the flow chart shown in FIGS. 5 and 6 is more than the minimum fuel injection rate thereof is referred to. When the flag is not "1", that is when the optimum fuel injection rate of the injector 4 is more than the minimum fuel injection rate thereof, the opening degree of the flow rate control valve 16 is increased by 0.2% at step 511 to increase the flow rate of the discharged hydrocarbon gas When the flag is "1", that is when the optimum fuel injection rate of the injector 4 is less than or equal to the minimum fuel injection rate thereof, the opening degree of the flow rate control valve 16 is decreased by 0.2% at step 512 to decrease the flow rate of the discharged hydrocarbon gas, and the control flow proceeds to step 513. As described above, the opening degree of the flow rate control valve 16 is adjusted according to the content of the discharged hydrocarbon gas so that the theoretical fuel air ratio is obtained. Incidentally, the changing rate 0.2% of the opening degree of the flow rate control valve 16 at steps 511 and 512 may be changed according to a routine cycle time used at the control flow shown in FIGS. 5-8 or the like. When the routine is repeated 100 times per second, the opening degree of the flow rate control valve 16 is changed by 20% per second.

At step 513, it is judged as to whether the opening degree of the flow rate control valve 16 determined as described above is more than or equal to a predetermined maximum opening degree or not. When the determined or calculated opening degree of the flow rate control valve 16 is more than or equal to the predetermined maximum opening degree, a desired opening degree of the flow rate control valve 16 is set at the predetermined maximum opening degree at step 514. Subsequently, at step 515, it is judged as to whether the opening degree of the flow rate control valve 16 determined as described above is less than or equal to a predetermined minimum opening degree or not. When the determined or calculated opening degree of the flow rate control valve 16 is less than or equal to the predetermined minimum opening degree, the desired opening degree of the flow rate control valve 16 is set at the predetermined minimum opening degree at step 516.

Finally, at step 517, the flow rate control valve 16 is operated by the duty ratio control to open by the desired opening degree, and the control routine for the flow rate control valve 16 is completed.

As explained above, since the opening degree of the flow rate control valve 16 is adjusted, a necessary flow rate of the evaporative gas for keeping the theoretical fuel air ratio is securely applied to the intake-air tube 2. Since both of the flow rate control valve 16 and the injector 4 are controlled according to the flow rate of the evaporative gas and the content of hydrocarbon gas in the evaporative gas, the theoretical fuel air ratio is securely applied to the intake-air tube 2, even when the flow rate of the evaporative gas and the content of hydrocarbon gas in the evaporative gas are changed largely.

Instead of that the flow rate of the evaporative gas and the content of hydrocarbon gas in the evaporative gas are obtained from the output signals of the sensor circuits 30 and 31 on the map calculated through the functional equations, they may be obtained directly from the output signals of the sensor circuits 30 and 31 through the functional equations. That is, the CPU 21 may calculate them from the output signals of the sensor circuits 30 and 31 through programs stored in the ROM 34 for processing the functional equations.

Figure 9:
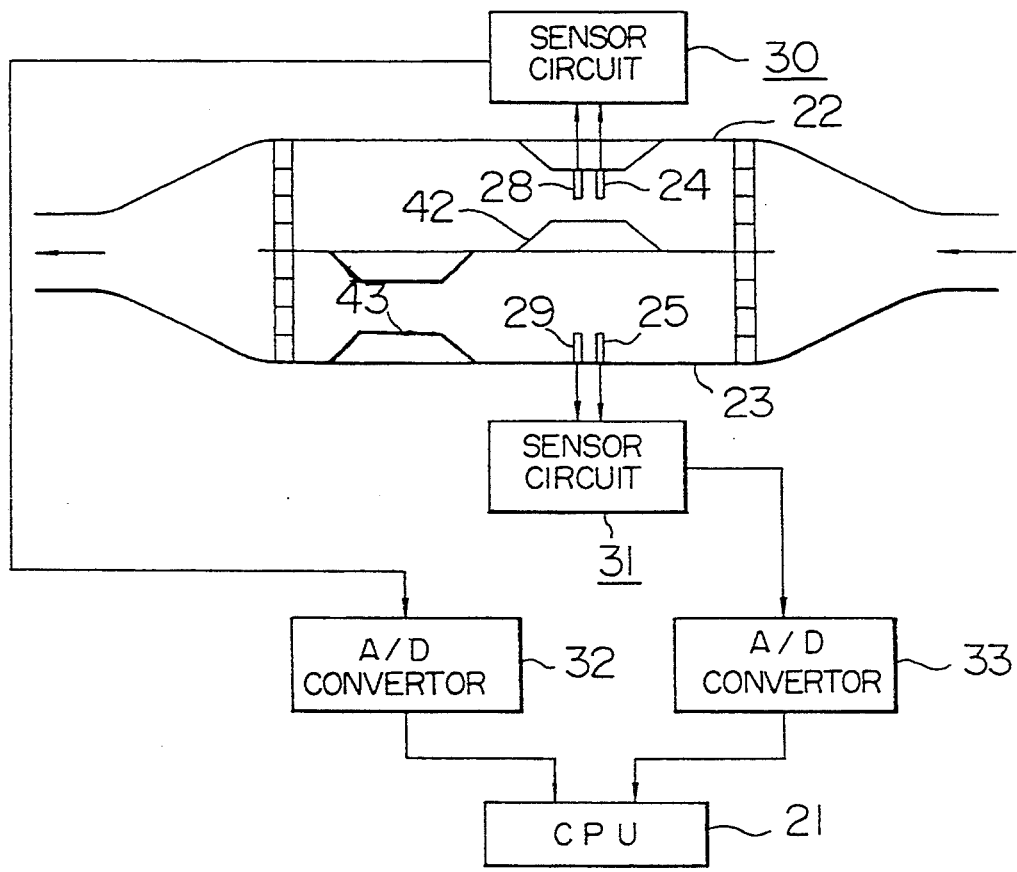
FIG. 9 is a schematic view showing another measuring system used for the present invention.

The measuring portions 22 and 23 may be arranged in parallel as shown in FIG. 9. Throttle portions 42 and 43 restrain the flow rates of in the measuring portions 22 and 23 respectively so that the flow rate of the measuring portion 22 is substantially equal to that of the measuring portion 23. The flow speed in the throttle portion 42 receiving the sensors 24 and 28 in the measuring portion 22 is different from the flow speed in a portion of the measuring portion 23 receiving the sensors 25 and 29. Since the flow rate of the evaporative gas and the content of hydrocarbon gas in the evaporative gas in the measuring portion 22 changes simultaneously with those in the measuring portion 23, this arrangement is effective for real time measuring when the flow rate of the evaporative gas and the content of hydrocarbon gas in the evaporative gas change rapidly.

Figure 12:
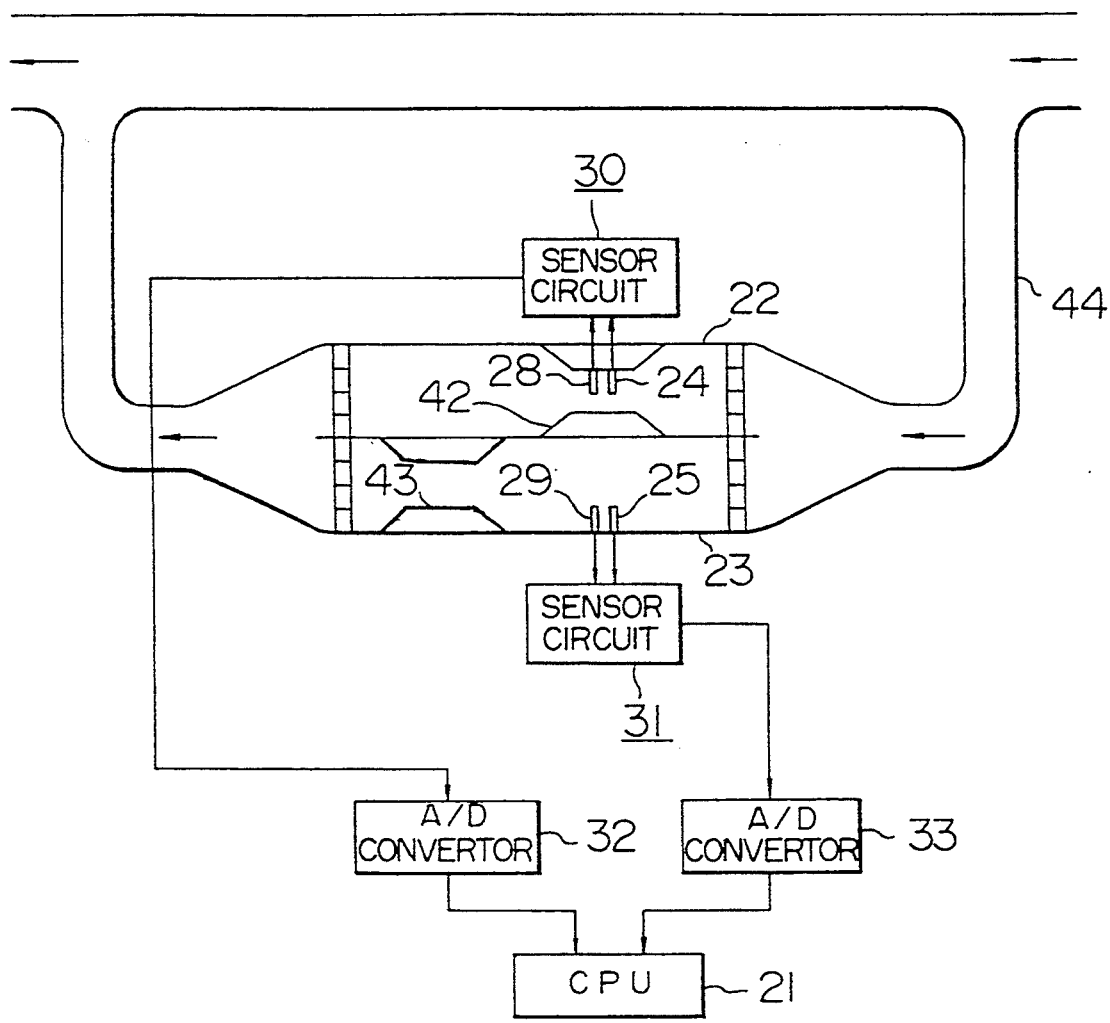
FIG. 12 is a schematic view showing another measuring system used for the present invention.
Figure 13:
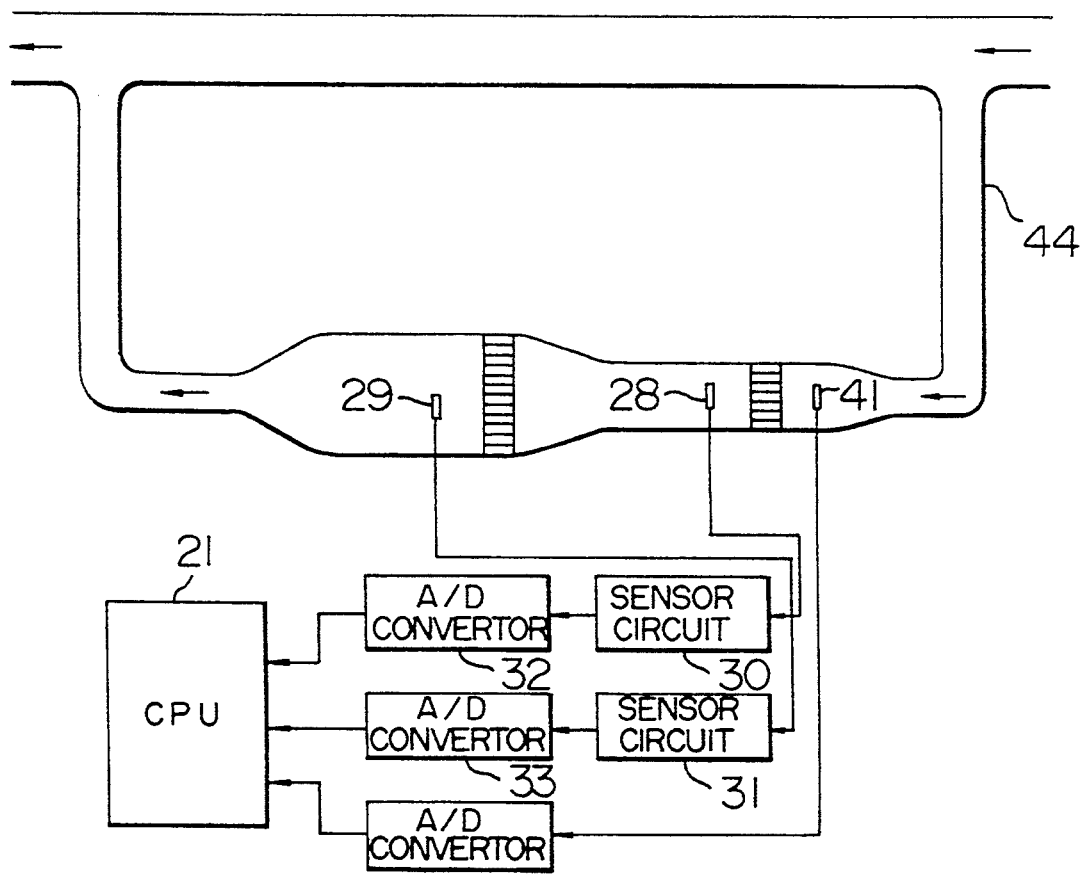
FIG. 13 is a schematic view showing another measuring system used for the present invention.

As shown in FIGS. 12 and 13, the measuring portions 22 and 23 may be arranged in a bypass 44 of the purge tube 11. A ratio of the flow rate or speed in the bypass 44 to the flow rate or speed in the purge tube 11 is substantially constant. This arrangement is useful when the flow rate of the evaporative gas is large.

Figure 10:
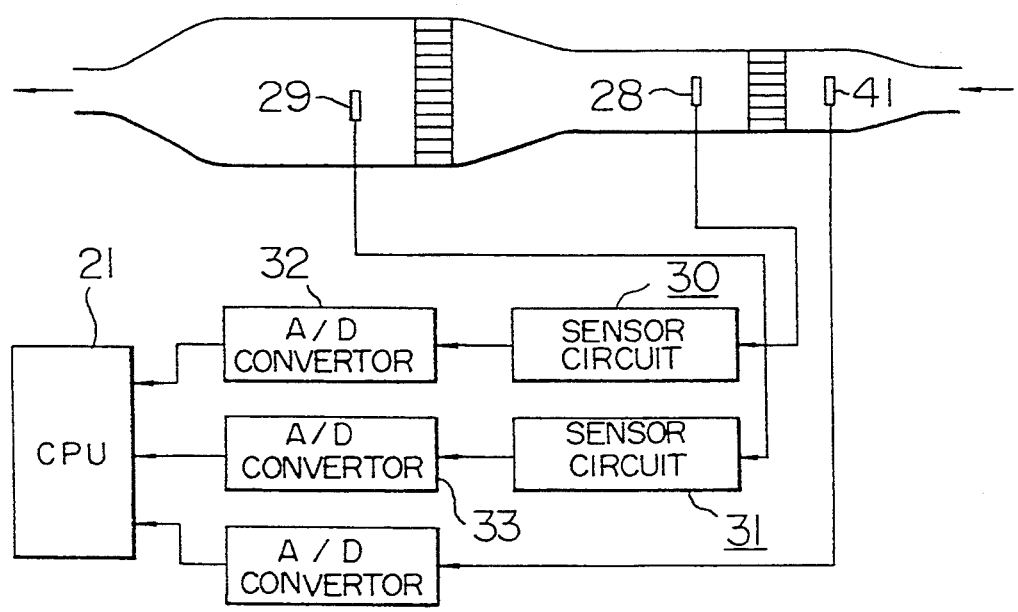
FIG. 10 is a schematic view showing another measuring system used for the present invention.
Figure 11:
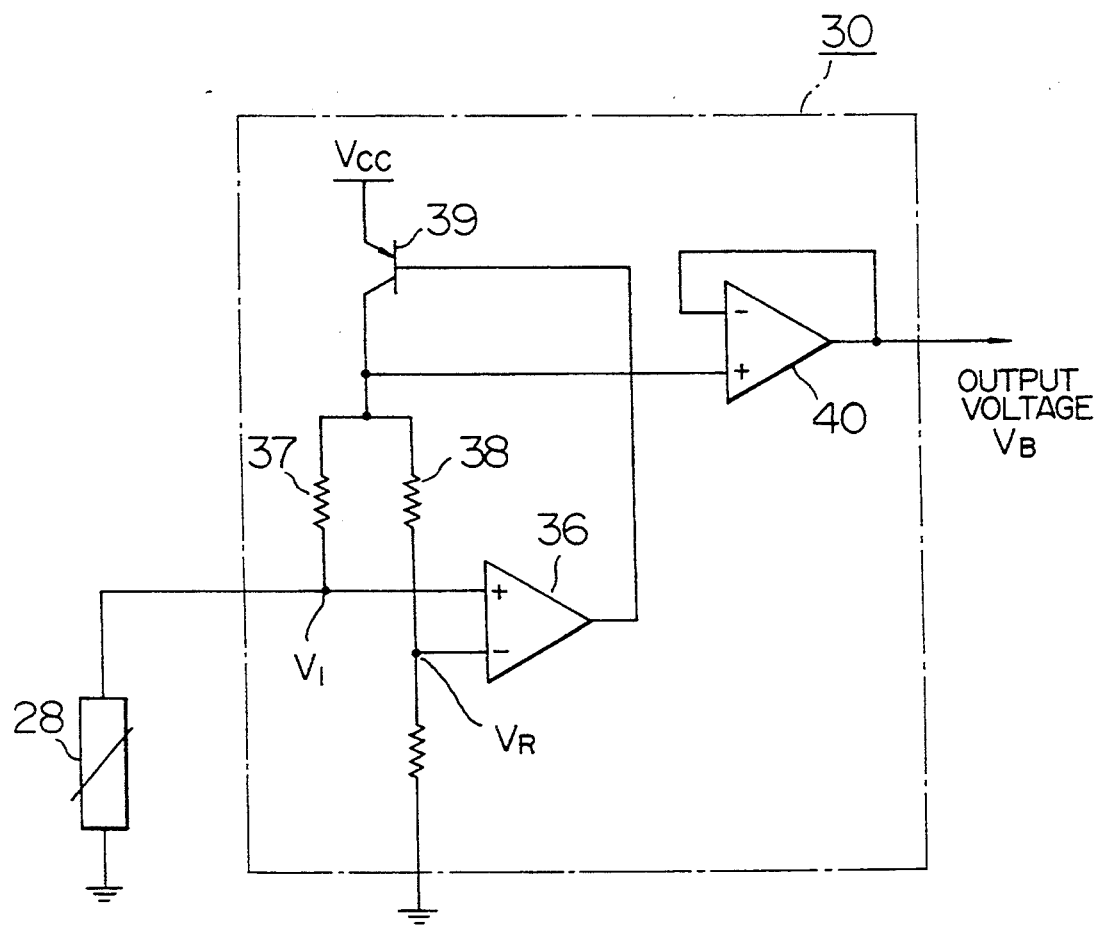
FIG. 11 is a diagram showing another electric circuit in a measuring system used for the present invention.

As shown in FIGS. 10 and 11, one temperature sensor 41 may be used to compensate both of the output signals from the sensor circuits 30 and 31.

If a measuring portion other than the measuring portions 22 and 23 is arranged in the purge tube 11, the data of the flow speed of the evaporative gas are increased to improve an accuracy of the measured flow rate.

The flow speed of the evaporative gas may be measured by another type sensor for measuring the flow speed thereon from an alternating pressure of Karman vortex, and the content or density of the hydrocarbon gas in the evaporative gas may be measured by a density sensor for measuring directly the density. Since the measured content or density changes according to the flow speed even when the content is constant, the measured density should be compensated according to the measured flow speed. In this case, it is not necessary for the flow speed to be changed for measuring the density.

It is not necessary for the flow speed and the density to be measured simultaneously.

Only one of the injector 4 and the flow rate control valve 16 may be controlled according to the flow rate of the evaporative gas and/or the content or density of the hydrocarbon gas in the evaporative gas. In this case, it is necessary for a flow rate variable range of the injector 4 or the flow rate control valve 16 to be large, or it is necessary for the output flow rate of the flow rate control valve 16 to be changed continuously.

The flow rate control valve 16 may be a variable opening degree type for replacing the variable duty ratio type.

Figure 14:
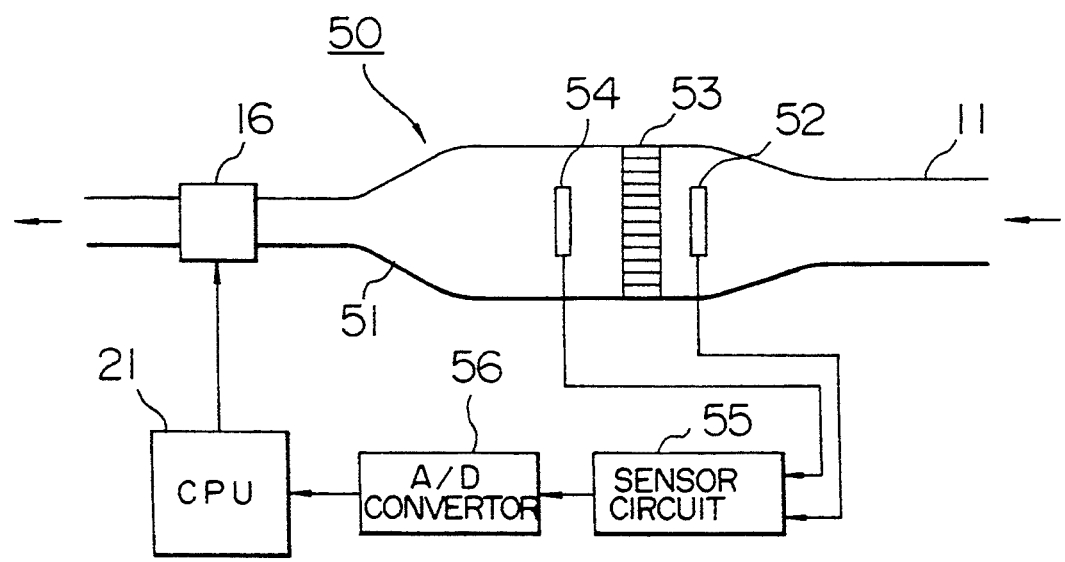
FIG. 14 is a schematic view showing another measuring system used for the present invention.

In another measuring device 50 as shown in FIG. 14, a measuring portion 51 is arranged on the purge tube 11, and a temperature sensor 52 of heat generating electrical resistance is arranged at the most upstream side of the measuring portion 51. A laminar flow generating plate 53 is arranged between the measuring portion 51 and the temperature sensor 52, and a sensor 4 of heat generating electrical resistance is arranged at a downstream side of the laminar flow generating plate 53. The temperature sensor 52 and the sensor 54 are electrically connected to a sensor circuit 55. The sensor circuit 55 is electrically connected to the CPU 21 through an analogue-to-digital (A/D) convertor 56 so that output signals of the temperature sensor 52 and the sensor 54 are input to the CPU 21. A combination of the measuring portion 51, the temperature sensor 52, the sensor 54, the sensor circuit 55 and the A/D convertor 56 forms a measuring device.

The flow rate control valve 16 is arranged at a downstream side of the measuring device 50. The output flow rate of the flow rate control valve 16 is changed through the duty ratio control or energizing pulse duration modulation to adjust the flow rate of the evaporative gas through the flow rate control valve 16. When the flow rate control valve 16 is completely closed to stop the flow from the canister 13, the evaporative gas is stationary in the measuring portion 51. Since the flow speed of the evaporative gas is zero, the heat energy transferred between the sensor 54 and the evaporative gas depends only on the characteristic of the evaporative gas or the content of the hydrocarbon gas in the evaporative gas. Therefore, an output signal of the sensor circuit 55 corresponds to the content of the hydrocarbon gas in the evaporative gas so that the CPU 21 calculates the content of the hydrocarbon gas in the evaporative gas from the output signal of the sensor circuit 55.

When the flow rate control valve 16 is open, the evaporative gas from the canister 13 passes in the measuring portion 51. In this case, the heat energy transferred between the sensor 54 and the evaporative gas depends on the flow speed of the evaporative gas in the measuring portion 51 and the characteristic of the evaporative gas or the content of the hydrocarbon gas in the evaporative gas. The output signal of the sensor circuit 55 corresponding to the flow speed of the evaporative gas and the content of the hydrocarbon gas in the evaporative gas are input to the CPU 21 to calculate the flow rate of the evaporative gas on the basis of the content of the hydrocarbon gas measured when the flow rate control valve 16 is closed. Further, the CPU 21 calculates the flow rate of the hydrocarbon gas in the evaporative gas and the flow rate of the air contained in the evaporative gas on the basis of the flow rate of the evaporative gas and the content of the hydrocarbon gas.

Figure 15:
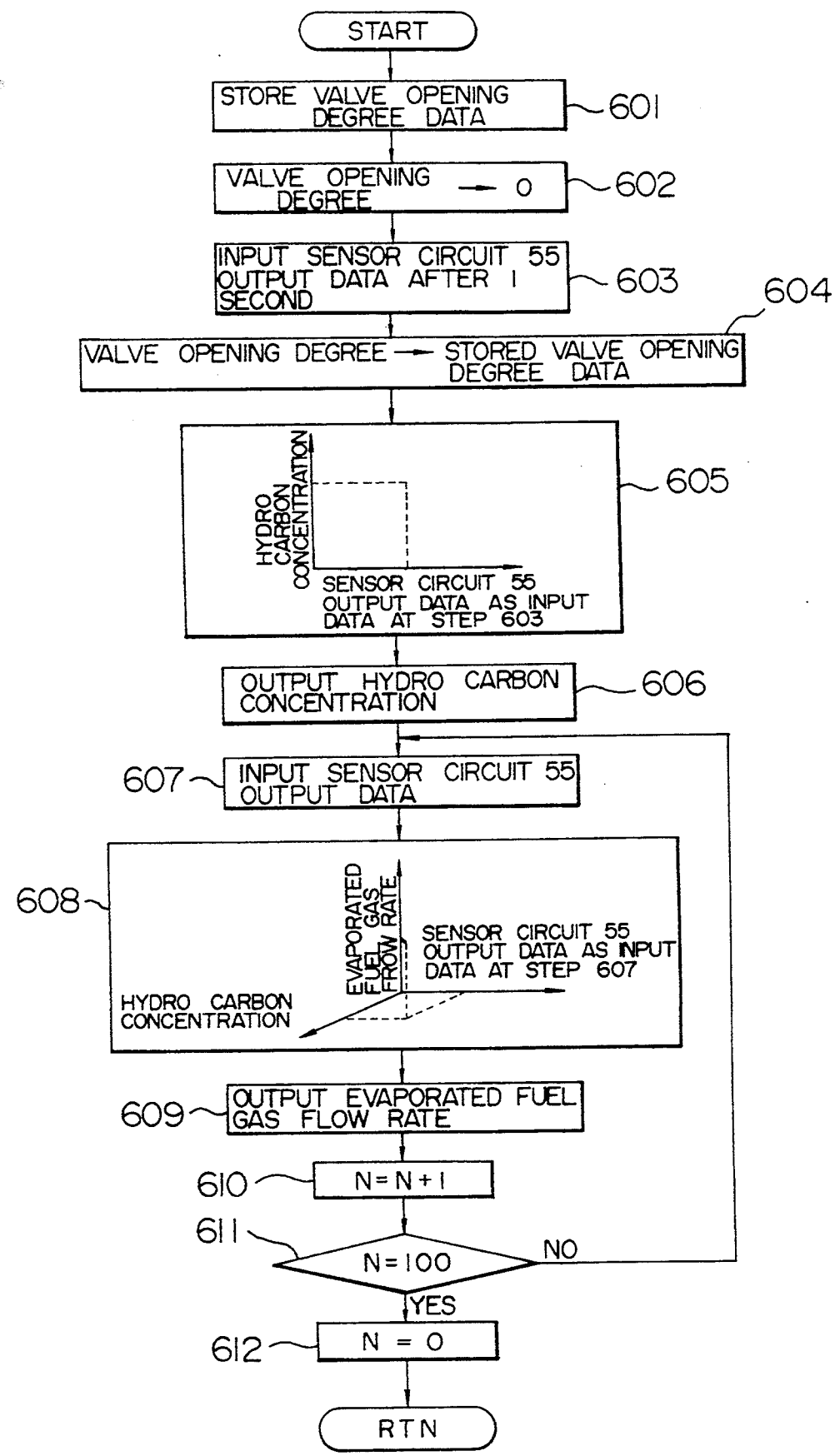
FIG. 15 is another flow chart for measuring the flow rate (speed) of the evaporative gas and the content of hydrocarbon (vaporized fuel) contained by the evaporative gas.

A control flow routine shown in FIG. 15 is repeated with a predetermined cycle time. The flow rate control valve 16 is controlled similarly to the before mentioned embodiment. Firstly, at step 601, the data corresponding to the present opening degree of the flow rate control valve 16 is stored temporarily in the RAM 35, and at step 602, the flow rate control valve 16 is completely closed. Subsequently, at step 603, after a predetermined time (for example, 1 second) elapses, the output signal from the sensor circuit 55 after A/D conversion is stored temporarily in the RAM 35. At step 604, the flow rate control valve 16 is controlled according to the the data stored at step 601.

At step 605, a content data of the hydrocarbon gas on a content data map stored in the ROM 34 is identified by one-dimensional address corresponding to the output signal of the sensor circuit 55 stored at step 603. At step 606, the identified content data of the hydrocarbon gas is stored temporarily in the RAM 35. Step 607, the output signal of the sensor circuit 55 after A/D conversion is read out and stored in the RAM 35. At step 608, a flow speed data of the evaporative gas on a flow speed data map stored in the ROM 34 is identified by two-dimensional address corresponding to the content data of the hydrocarbon gas stored in the RAM 35 at step 606 and to the output signal of the sensor circuit 55 read out at step 607. At step 609, the flow rate of the evaporative gas is calculated from the flow speed data of the evaporative gas and a cross-sectional opening area of the measuring portion 51, and is stored temporarily in the RAM 35.

At step 610, a number of times of measuring the flow rate of the evaporative gas is increase by 1, and at step 611, it is judged as to whether the number of times reaches a predetermined number (for example, 100). When the number of times does not reach the predetermined number, the control flow returns to step 607 so that the measuring the flow rate of the evaporative gas is repeated until the number of times thereof reaches 100. When the number of times reaches 100, the control flow proceeds to step 612 to reset the number of times by 0 and to complete this control routine. In this routine, the flow rate of the evaporative gas is measured 100 times and the content of the hydrocarbon gas is measured 1 time, because the flow rate of the evaporative gas varies largely and the content of the hydrocarbon gas varies slightly in an actual condition. Therefore, a number of times of closing completely the flow rate control valve 16 is small, and the accuracy of measuring the flow rate is improved.

The maps used at steps 605 and 608 are obtained as described below. When the heat energy Q is generated by the sensor 54, $f(\lambda, \mu)$ is the dynamic heat exchange coefficient, $g(\lambda, \mu)$ is the static heat exchange coefficient, $\lambda$ is the heat transfer coefficient of the gas, $\mu$ is the viscosity of the gas, U is the gas flow speed, T is a temperature of the sensor 54, and TG is the temperature of the gas, the following functional equation is obtained.

$$Q = \{f(\lambda, \mu)^* U^{1/2} + g(\lambda, \mu)\}^*(T - TG) \quad (7)$$

When the heat energy Qc is generated by the sensor 54 when the flow rate control valve 16 is completely closed, that is, the gas flow speed is zero, and the heat energy Qo is generated by the sensor 54 when the flow rate control valve 16 is open by a predetermined opening degree, the following functional equations are obtained.

$$Qc = g(\lambda, \mu)^*(T - TG) \quad (8), \text{ and}$$

$$Qo = \{f(\lambda, \mu)^* U^{1/2} + g(\lambda, \mu)\}^*(T - TG) \quad (9)$$

From the functional equation (8), the following functional equation is obtained.

$$g(\lambda, \mu) = Qc/(T - TG) \quad (10)$$

From the static heat exchange coefficient $g(\lambda, \mu)$, the component ratio of the gas or the content of hydrocarbon in the evaporative gas is obtained. Further, from the component ratio of the gas or the content of hydrocarbon in the evaporative gas, the dynamic heat exchange coefficient $f(\lambda, \mu)$ is obtained. Through the functional equation (9), the evaporative gas flow speed U obtained when the flow rate control valve 16 is open at the measuring portion 51 is calculated from the static heat exchange coefficient $g(\lambda, \mu)$ and the dynamic heat exchange coefficient $f(\lambda, \mu)$. The flow rate of the evaporative gas is calculated from the evaporative gas flow speed U and the cross-sectional opening area of the measuring portion 51. On the basis of the obtained flow rate of the evaporative gas and the obtained content of hydrocarbon in the evaporative gas, the injector 4 and the flow rate control valve 16 are controlled similarly to the before-mentioned control thereof.

The flow speed of the evaporative gas and the heat transfer characteristic between the sensor and the evaporative gas may be measured when the flow rate through the flow rate control valve 16 is adjusted according to the amount of the evaporative gas contained in the canister 13, so that the content of hydrocarbon in the evaporative gas and the flow rate of the evaporative gas are calculated from three generated heat energy data obtained respectively when flow speed of the evaporative gas is zero, the predetermined value and the value according to the amount of the evaporative gas contained in the canister 13.

The flow rate control valve 16 may be arranged at an upstream side of the measuring device 50 in the purge tube 11.

What is claimed is:

1. A method for controlling a fuel/air ratio of a mixture gas at an intake portion of an engine, comprising the steps of:
    detecting a characteristic of an evaporative gas at a plurality of measuring portions in a gas path by which the evaporative gas is supplied between a fuel tank and the intake portion, wherein the evaporative gas at each one of the plurality of measuring portions has a corresponding flow speed, and wherein the corresponding flow speed at one of the measuring portions is different from the corresponding flow speed at another of the measuring portions;
    determining the corresponding flow speeds and a concentration of a predetermined component which is included within the evaporative gas, based upon each detected characteristic; and
    controlling the fuel/air ratio at the intake portion in accordance with the determining step.

2. A method according to claim 1, wherein the predetermined component is hydrocarbon.

3. A method according to claim 1, wherein each detected characteristic is detected from a corresponding heat energy transfer from a corresponding heater disposed at a corresponding one of the measuring portions.

4. An apparatus for controlling a fuel/air ratio of a mixture gas comprising:
    an evaporative gas path for transporting an evaporative gas between a fuel tank and an intake portion to an engine, wherein the evaporative gas path has a plurality of measuring portions, wherein the evaporative gas at each one of the plurality of measuring portions has a corresponding flow speed, and wherein the corresponding flow speed at one of the measuring portions is different from the corresponding flow speed at another of the measuring portions;
    means for detecting a characteristic of the evaporative gas at each one of the plurality of measuring portions;
    means for determining an evaporative gas flow rate and a concentration of a hydrocarbon which is included within the evaporative gas based upon the detection results of the detecting means; and
    control means for controlling the fuel/air ratio of the mixture gas at the intake portion in accordance with the evaporative gas flow rate and the concentration of the hydrocarbon determined by the determining means.

5. An apparatus according to claim 4, wherein the detecting means includes a plurality of heaters, each one of the heaters being disposed at a corresponding one of the measuring portions, and wherein the determining means determines the evaporative gas flow rate and the concentration of the hydrocarbon based upon heat energy transfers of the heaters.

6. An apparatus according to claim 4, wherein the measuring portions are arranged in series along the evaporative gas path.

7. An apparatus according to claim 4, wherein the measuring portions are arranged in parallel along the evaporative gas path.

8. An apparatus according to claim 4, wherein the evaporative gas path further comprises:
    a main path; and
    a bypass path, connected to and diverging from the main path, having the measuring portions.

9. An apparatus according to claim 5, wherein the control means further comprises:
    means for calculating a hydrocarbon flow rate based upon the evaporative gas flow rate and the concentration of the hydrocarbon;
    means for calculating a fuel flow rate for the engine in accordance with a condition of the engine;
    compensation means for changing the calculated fuel flow rate in accordance with the hydrocarbon flow rate; and
    means for supplying the mixture gas at the changed fuel flow rate to the intake portion.

10. An apparatus according to claim 9, wherein the engine condition is an intake flow rate of the engine, and wherein the intake flow rate includes an air flow rate of the evaporative gas which is calculated from the evaporative gas flow rate and the hydrocarbon flow rate.

* * * * *